United States Patent [19]

Turner et al.

[11] Patent Number: 5,482,082

[45] Date of Patent: Jan. 9, 1996

[54] MULTI-PASSAGE FLUID COUPLING AND METAL SEAL THEREFOR

[75] Inventors: Edwin C. Turner; Danny K. Wolff, both of Houston, Tex.

[73] Assignee: Cooper Cameron Corporation, Houston, Tex.

[21] Appl. No.: 264,075

[22] Filed: Jun. 22, 1994

[51] Int. Cl.$^6$ .................................................. F16L 37/28
[52] U.S. Cl. ...................... 137/614.03; 285/137.1
[58] Field of Search ..................... 285/137.1; 137/614.03

[56] References Cited

U.S. PATENT DOCUMENTS

| | | |
|---|---|---|
| 1,973,610 | 9/1934 | Connors . |
| 2,599,935 | 6/1952 | Pasker . |
| 2,714,518 | 8/1955 | Balass ............................ 137/614.03 |
| 3,345,088 | 10/1967 | Nagle .................. 285/137.1 X |
| 3,730,221 | 5/1973 | Vik . |
| 3,918,485 | 11/1975 | Weber et al. . |
| 4,125,278 | 11/1978 | Hargraves .................... 285/137.1 X |
| 4,285,364 | 8/1981 | Hawker ........................... 137/614.03 |
| 4,460,156 | 7/1984 | Hazelrigg et al. ............... 285/137.1 X |
| 4,694,859 | 9/1987 | Smith, III . |
| 4,754,780 | 7/1988 | Smith, III . |
| 4,756,199 | 7/1988 | Merritt . |
| 4,832,080 | 5/1989 | Smith, III . |
| 4,903,776 | 2/1990 | Nobileau et al. . |
| 4,911,244 | 3/1990 | Hynes . |
| 5,020,593 | 6/1991 | Milberger . |
| 5,385,169 | 1/1995 | Odelius . |

FOREIGN PATENT DOCUMENTS

| | | |
|---|---|---|
| 1142462 | 9/1957 | France . |
| 1491524 | 8/1967 | France . |
| 352205 | 3/1961 | Switzerland . |

OTHER PUBLICATIONS

Article: Cameron Iron Works, Inc., p. 1366 (1976/1977).

*Primary Examiner*—John C. Fox
*Attorney, Agent, or Firm*—Burns, Doane, Swecker & Mathis

[57] ABSTRACT

A fluid coupling, e.g., a subsea coupling, includes male and female parts which can be coupled together. The female part includes four passages normally closed by a slidable gate. The male part includes four passages normally closed by a closure slide. When the male and female parts are coupled together, the gate is pushed aside by the gate part and becomes temporarily joined thereto, and the closure slide is pushed aside by the female part and is temporarily joined thereto. When the male and female parts are uncoupled, the gate and closure slide are moved back to their passage-closing positions. A metal sealing member for the passages includes annular thick and thin lips. The thin lip provides flexibility, and the thick lip engages a relatively movable part.

15 Claims, 3 Drawing Sheets

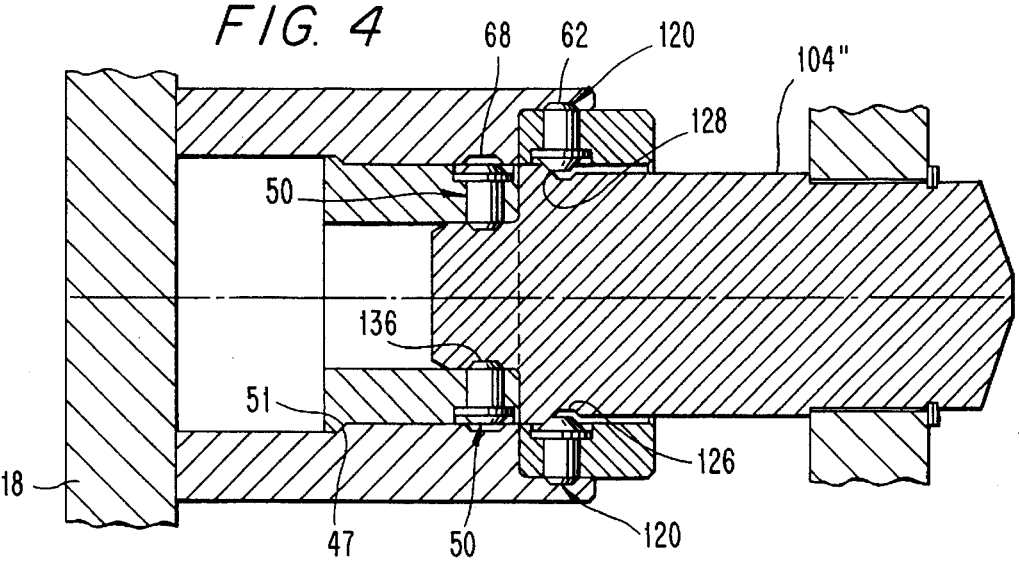
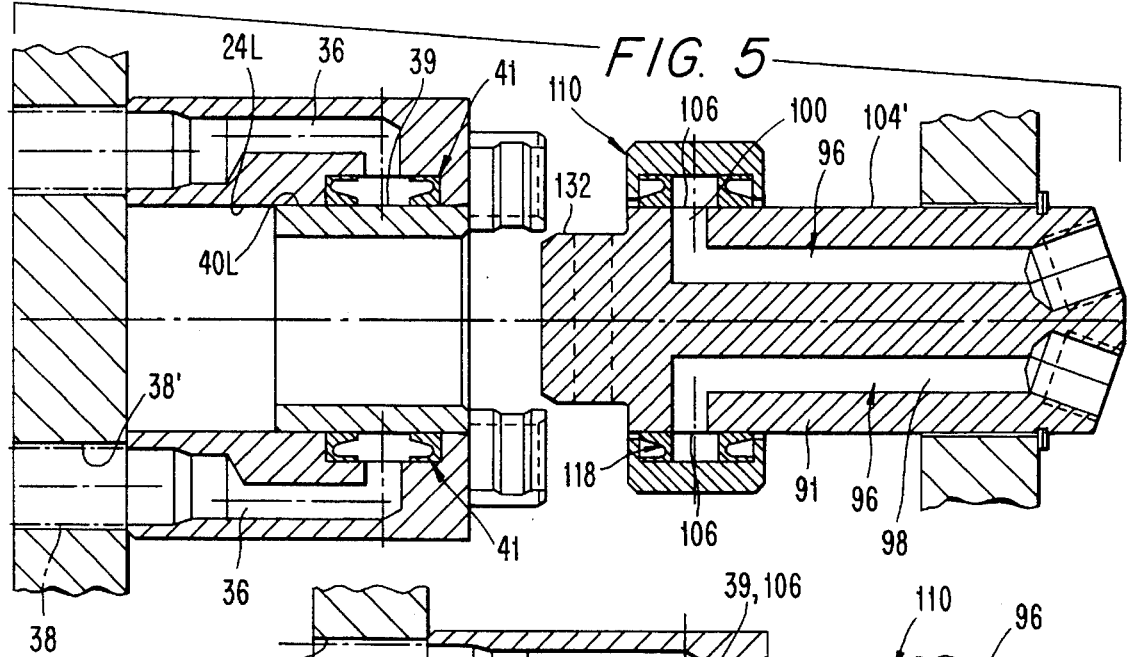
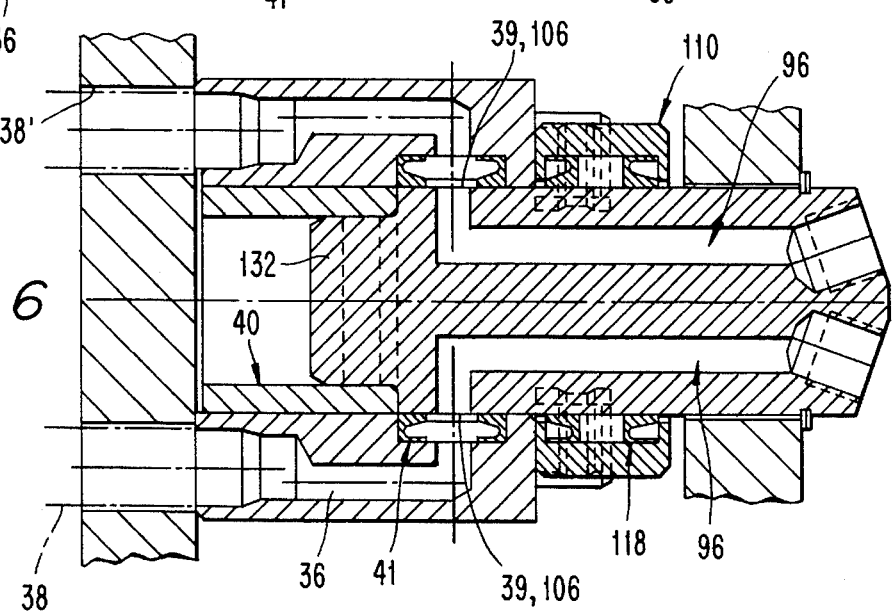

5,482,082

MULTI-PASSAGE FLUID COUPLING AND METAL SEAL THEREFOR

BACKGROUND OF THE INVENTION

The present invention relates to fluid couplers and, in particular, to a quick-disconnect fluid coupler employing metal-to-metal seals.

Quick-disconnect fluid couplings have been heretofore proposed for use in submerged and non-submerged applications. An example of a submerged application is a subsea fluid coupler such as that commonly used in connection with subsea oil wells. Functions of the subsea well are controlled by subsea devices such as valves which are actuated by hydraulic fluid. That fluid is delivered from the water surface through fluid supply conduits which are connected to the subsea well by means of underwater couplings. It is conventional to employ underwater couplings which can be quickly connected and disconnected. Each coupling includes male and female parts connected to respective common mounting plates. By converging the mounting plates, simultaneous connection of the male and female parts can be made. Likewise, simultaneous disconnection of the male and female parts can be made by separating the mounting plates.

Each coupling, i.e., each pair of male and female parts controls the flow of hydraulic fluid to one subsea device. It is common to employ a relatively large number of subsea devices, necessitating the provision of many couplings which results in the overall fluid control structure being very large and awkward to handle. It would be desirable to minimize the overall size of that structure, and/or to enable more fluid passages to be provided for a structure of given size.

Furthermore, the mating of each male part with a female part results in the need to create a seal about an interfacing between the male and female parts. It is conventional to employ metal seals to perform that sealing function. While metal seals are more durable than elastomeric seals, they do wear, and their replacement represents a considerable inconvenience. If the rigidity of the seals is increased in an effort to increase wear life, the resulting stiffness of the seals may inhibit proper relative movement and play between the male and female parts. Therefore, it would be desirable to provide metal seals which have a long wear life and yet are sufficiently elastic to facilitate relative movement between the male and female parts.

SUMMARY OF THE INVENTION

The present invention relates to a fluid coupling comprising a female part, a male part, and metal seals. The female part includes a housing having a longitudinal aperture formed therein and defining a longitudinal axis. The aperture is of polygonal cross-section comprising at least three inwardly facing walls. A first plurality of at least three liquid conducting passages is formed in the housing, those passages intersecting respective ones of the walls to form first lateral ports. A gate is mounted in the aperture for longitudinal sliding movement between a port blocking position and a port unblocking position. The male part includes a conduit body defining a longitudinal axis and configured to enter the aperture. The conduit body is of polygonal cross-section corresponding to that of the aperture. The conduit body comprises at least three upwardly facing walls arranged to be disposed opposite respective ones of the inwardly facing walls once the male and female parts have been joined. A second plurality of at least three liquid conducting passages is formed in the conduit body, those passages intersecting respective ones of the outwardly facing walls to form second lateral ports. A closure slide is mounted on the conduit body for longitudinal sliding movement between a port blocking position and a port unblocking position. The male conduit body is insertable axially into the aperture such that the conduit body pushes the gate to its port unblocking position, and the housing pushes the closure slide to its port unblocking position, and further so that each of the first ports becomes laterally aligned with one of the second ports. The metal seals are provided for sealing around each pair of first and second ports once those ports are aligned with one another.

Preferably, a first releasable connector pin is provided for alternately connecting the gate to the conduit body and housing in response to relative axial movement between male and female parts. A second releasable connector pin is provided for connecting the closure slide alternately to the housing and conduit body in response to relative axial movement between the male and female parts.

Each metal seal preferably comprises an annular metal seal member having a center hole therethrough defining a center axis. The seal member includes first and second annular lips spaced apart along that axis and forming a groove therebetween. Each lip includes an anchored end and a free end. The anchored end of the first lip is thicker than the anchored lip of the second lip so that the deflection of the seal member occurs only in the second lip.

Each seal is mounted so that the first and second lips contact respective surfaces on the male and female parts. The surface engaged by the first lip is preferably a surface which slides relative to the first lip, and the surface engaged by the second lip is preferably a surface which is stationary with respect to the second lip.

The present invention further relates to a fluid coupling having the above-described releasable pin arrangement. Another aspect of the invention relates to the above-described metal seal alone and in combination with the surfaces which it engages.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 4 is a view similar to FIG. 3 with the coupling in a partially uncoupled state;

FIG. 5 is a longitudinal sectional view similar to FIG. 1, with the view being taken about a plane oriented at forty-five degrees relative to the plane about which FIG. 1 was taken;

FIG. 6 is a view similar to FIG. 5 with the male and female parts in a fully coupled condition;

DETAILED DESCRIPTION OF PREFERRED EMBODIMENTS OF THE INVENTION

Figure 1:
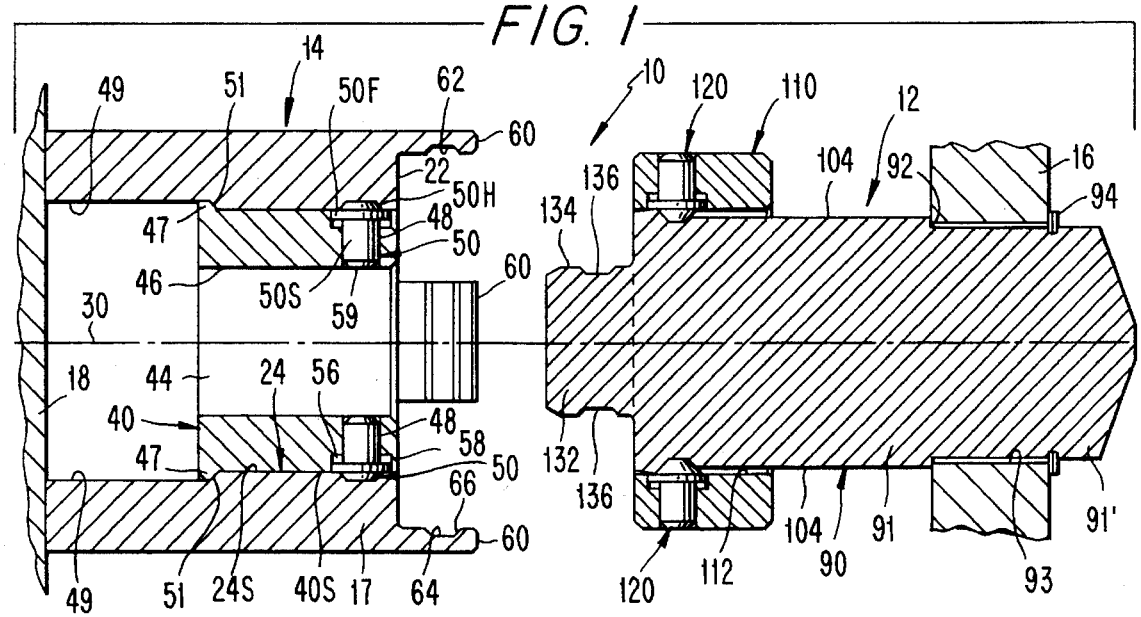
FIG. 1 is an axial sectional view of a fluid coupling according to the present invention in an uncoupled condition.

The preferred embodiments of the present invention are disclosed below in connection with a subsea fluid coupler, but will be appreciated that the invention has utility in any environment disposed above or below sea level.

An underwater coupling 10 depicted in FIGS. 1–8 comprises male and female parts 12, 14 affixed to respective mounting plates 16, 18. It will be appreciated that numerous identical couplings 10 are affixed to the plates 16, 18 for simultaneous connection and disconnection as the plates are converged and separated.

The female part 14 includes a metal housing 17 which is affixed to the mounting plate 18 in any suitable fashion, e.g., by welds or bolts. The housing 17 includes an end face 22 which faces the male part 12. Extending into the housing 17 through the end face 22 is an aperture 24 of polygonal, e.g., octagonal crosssection. The octagonal aperture 24 includes four planar long walls 24L and four planar short walls 24S arranged in alternating fashion about a longitudinal center axis 30 of the aperture 24 (see FIG. 7).

Figure 7:
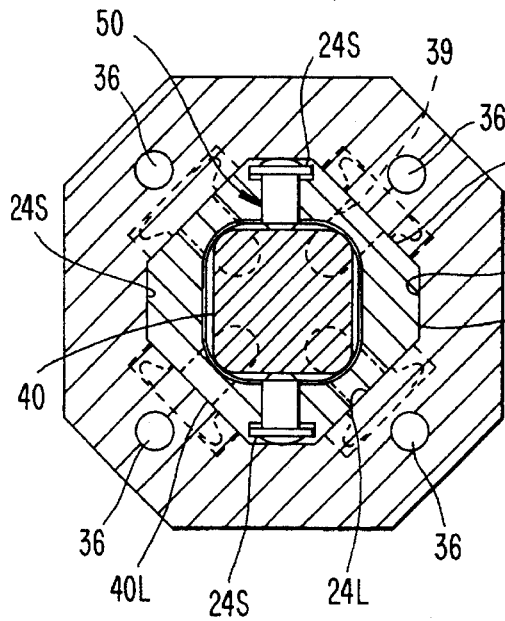
FIG. 7 is a cross-sectional view taken along the line 7—7 of FIG. 3.

A plurality of, e.g., four fluid passages 36 is formed in the housing 17 (see FIGS. 5 and 7). One end of each passage 36 is adapted to be connected to a flexible supply conduit 38 extending to a hydraulic fluid source at the water surface. The supply conduits pass through openings 38' formed in the mounting plate 18. Another end of each passage 36 intersects a respective long wall 24L of the aperture 24 to form therewith a port 39 communication the passage 36 with the aperture 24. Disposed in each port 39 is a metal seal member 41 of a configuration to be discussed later herein.

A metal gate 40 of octagonal outer cross section is slidably disposed in the aperture 24. The gate includes long and short planar outer surfaces 40L, 40S which slidably engage respective long and short aperture walls 24L, 24S. The gate 40 is hollow and includes a center through-hole 44 of polygonal, e.g., square, cross section. The square hole 44 is formed by four walls 46. Two of the walls 46 are formed with laterally outwardly projecting stop lips 47 (see FIG. 1) which slide within longitudinal slots 49 formed in two of the short walls 24S of the aperture 24 of the housing 17. Those slots 49 terminate in stop shoulders 51 which are engageable with the stop lips 47 to limit the extent of relative movement between the housing and gate in one longitudinal direction (i.e., to the right in FIG. 1).

Two holes 48 extend laterally through the gate, each hole 48 intersecting one of the outer surfaces 40S and one of the walls 46. Mounted in each hole 48 is a freely slidable latching pin 50. Each pin 50 includes a cylindrical stem 50S and a head 50H, the latter fitting into a counterbore 56 of the respective hole 48. Laterally inward sliding movement of the pins 50 is limited by contact of flanges 50F of the heads 50H with shoulders 58 defined by the counterbores 56. Each stem 50S has a chamfer 59 at an end thereof located opposite the head 50H. The head 50H is also chamfered.

The housing 17 includes a plurality of longitudinally projecting, circumferentially spaced fingers 60. Formed in an inner face 61 of at least two of the fingers is a recess 62 (see FIGS. 1 and 8). Each recess has a base surface 64 and an inclined side surface 66. Likewise, formed in two of the surfaces 42 of the through-hole 44 is a similarly configured recess 68 having an inclined side surface 69 (see FIG. 3). Each recess 68 is configured to receive a chamfered end of the head of a pin 50. Likewise, the recesses 62 are configured to receive chamfered ends of the stems of pins carried by the male part 12, as will be discussed hereinafter.

Figure 8:
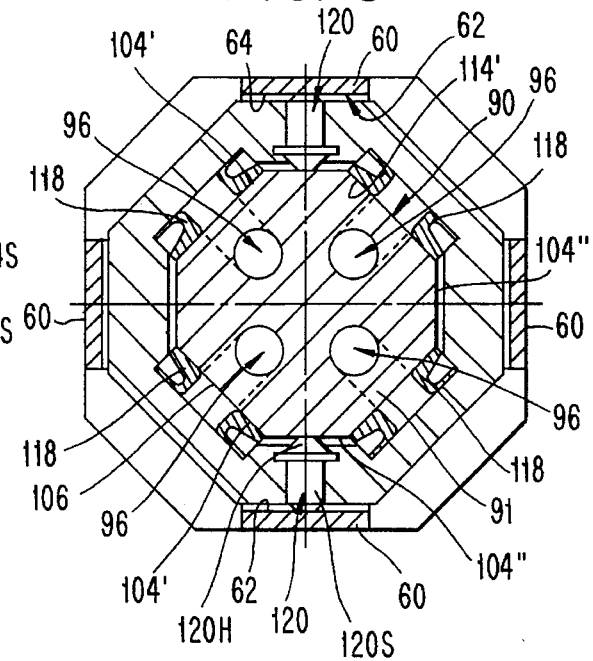
FIG. 8 is a cross-sectional view taken along the line 8—8 in FIG. 3.
Figure 9:
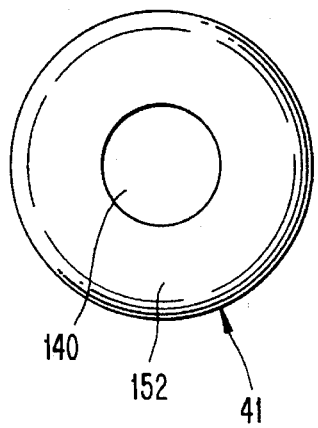
FIG. 9 is a plan view of a metal sealing member according to the present invention.

The male part 12 comprises a metal conduit body 90 having a main portion 91 of polygonal, e.g., octagonal cross section (see FIG. 8). A mounting end 91' of the main portion 91, which extends through a hole 93 in the mounting plate 16, is recessed along two sides to form shoulders 92 which abut the mounting plate 16. A pair of retaining rings 94 engage a recess formed in the mounting end 91' to secure the body 90 to the mounting plate 16. The hole 93 is of larger cross-section when the mounting end 91', permitting a certain amount of lateral play of the mounting end 91', so that the male part is self-aligning with respect to the aperture 24 of the female part during installation of the latter.

The main portion 91 of the conduit body 90 has four passages 96 extending therethrough (see FIGS. 5 and 8). Each passage 96 includes a longitudinal portion 98 and a lateral portion 100. Each longitudinal portion 98 is adapted to be connected to a conduit (not shown) which conducts hydraulic fluid from the coupling 10 to the well head (not shown). Each lateral portion 100 intersects a respective one of four outer surfaces 104' of the main portion 91 to form a port 106. At least two of the other outer surfaces 104" of the main portion 91 are recessed to receive pins as will be discussed.

Mounted on the main portion 91 of the body 90 is a closure slide 110 which is adapted for axial sliding movement relative to the conduit body 90. The slide 110 contains an axial through-hole 112 of octagonal shape which defines eight surfaces 114', 114". Formed in four of those surfaces 114' are recesses 116 in which seals 118 are disposed, the configuration of which will be subsequently described. The surfaces 114' which contain the seals 118 are situated opposite the ports 106 formed in the body 90. Thus, when the closure slide 110 is situated in a port-blocking position shown in FIGS. 1 and 1A, the seals 118 will form a seal around the ports 106.

Two of the surfaces 114" which do not carry seals 118 carry slidable pins 120, the pins 120 being in alignment with one another (see FIG. 5). Those pins 120 are configured identically to the pins 50 disposed in the gate 40 in that they have chamfered heads 120H and chamfered stems 120S. The chamfered stems 120S are configured to fit into the recesses 62 formed in the fingers 60 of the housing 17, and the chamfered heads 120H are configured to fit into recesses 126 formed in respective surfaces 104" of the conduit body 90 (see FIG. 4). A side wall 128 of each recess 126 which is located farthest from the mounting plate 16 projects higher than a side wall 129 located closest to the mounting plate 16 (see FIG. 3). This ensures that the closure slide 110 will become attached to the conduit body 90 during a disconnection of the coupling 10, as will be explained hereinafter.

Projecting from the main portion 91 of the conduit body 90 is a tongue 132 which projects toward the housing 17. The tongue 132 is of square-shaped cross section, corresponding to the cross-sectional configuration of the square hole 44 formed in the gate 40. Two outer walls 134 of the tongue include recesses 136, each configured to receive the chamfered stem 50S of a pin 50, as will be discussed.

IN OPERATION, when the coupling 10 is about to be connected, the plate 18 is oriented so that the male and female parts 12, 14 are in the position shown in FIGS. 1 and 5. In that position, the chamfered heads 50H of the pins 50 are received in the recesses 68 of the housing 17, and the chamfered heads 120H of the pins 120 are received in the recesses 126 of the conduit body 90. Hence, the gate 40 is connected for movement with the housing 17 and plate 18, and the closure slide 110 is joined to the conduit body 90.

The plates 16 and 18 will each be in a horizontal orientation, with the plate 18 positioned above the plate 16. To connect the coupling 10 (and all other couplings that are joined to the plates 16, 18), the plate 18 is lowered toward the plate 16, i.e., is moved to the right in FIG. 1.

Figure 2:
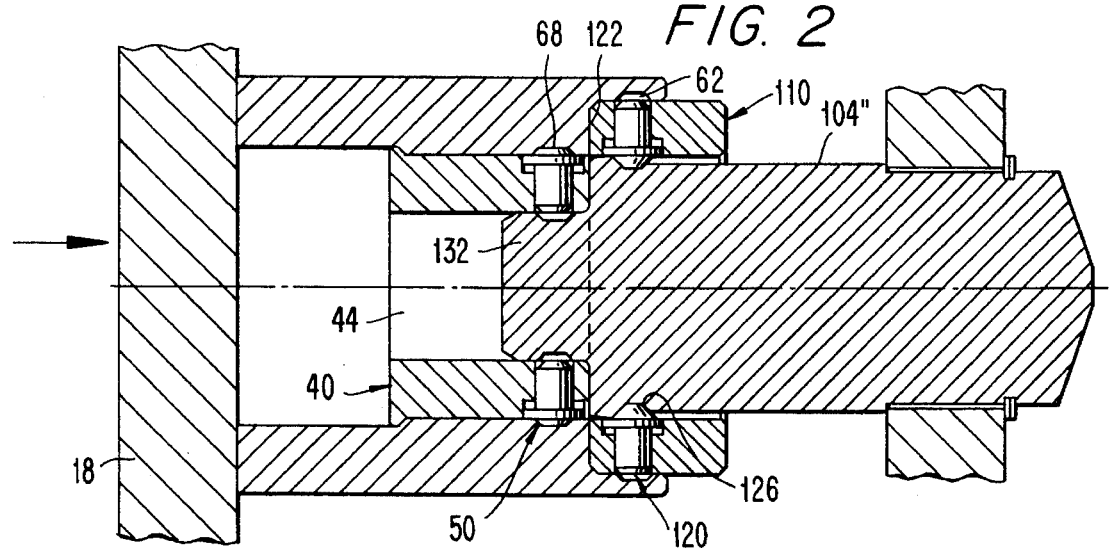
FIG. 2 is a view similar to FIG. 1 after a female part of the coupling has been partially moved to a connected state.
Figure 3:
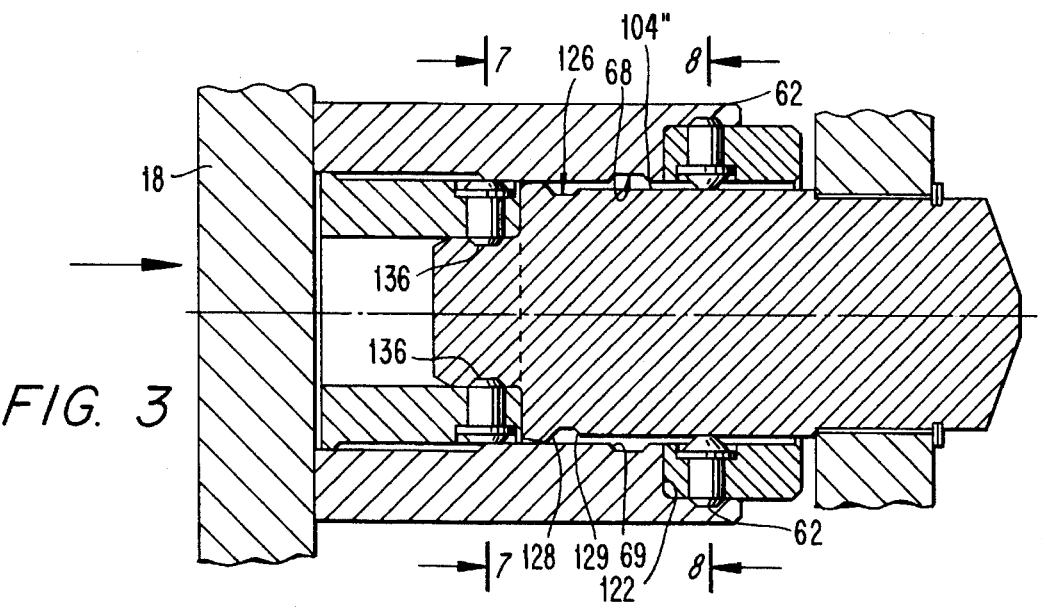
FIG. 3 is a view similar to FIG. 2 after the male and female parts have been fully coupled together.

As the plate 18 approaches the plate 16, the tongue 132 of the conduit body 90 enters the center through-hole 44 of the gate, and the closure slide 110 enters a space bounded by the fingers 60 of the housing 17, as shown in FIG. 2.

As the plate 18 continues to move toward the plate 16, the end face 22 of the housing 17 contacts the closure slide 110 and pressures the closure slide toward the plate 16. As a result, the side wall 129 of each recess 126 acts as a cam surface to push the respective pin 120 out of its recess 126 and into a recess 62 of the housing 17 to join the closure slide 110 to the housing 17. Also, the gate 40 abuts the conduit body 90 and is pressured thereby in a direction toward the plate 18. Consequently, a side wall of each recess 68 acts as a cam surface to push the respective pin 50 out of its recess 68 and into a recess 136 of the tongue 132 so as to join the gate 40 to the conduit body 90. The pins 120 and 50 remain in that conduit as the coupling reaches its connected state shown in FIGS. 3 and 6. The plates 16, 18 could then be connected together in any suitable fashion to retain the male and female parts 12, 14 of the coupling 10 (and all other couplings mounted to the plates 16, 18) in the connected state.

As the conduit body 90 enters the aperture 24, water in the latter is displaced from the aperture 24 along longitudinal gaps formed between the conduit body 90 and aperture.

In the connected state of the coupling, the ports 106 of the passages 96 are in communication with the ports 39 of the passages 36 (see FIG. 6), whereby hydraulic fluid can be conducted from the water surface to the well head via the coupling 10.

When it is desired to disconnect the coupling 10, the plate 18 is lifted from the plate 16 to reverse the procedure explained above. That is, as the housing 17 moves up, i.e., moves to the left relative to the conduit body 90 in FIG. 3, the gate 40 will initially remain stationary due to its connection with the conduit body 90 via pins 50, and the closure slide 110 will travel with the housing 17 due to its connection therewith via pins 120.

Eventually, the stop shoulders 51 of the housing 17 engage the stop lips 47 of the gate 40 as shown in FIG. 4, whereafter further movement of the mounting plate 18 to the left causes the gate 40 to be urged to the left. Accordingly, the sides of the recesses 136 of the tongue 132 cam the pins 50 out of the recesses 136 and into the recesses 68 of the housing. Simultaneously, the heads 120H of the pins 120 engage the high sides 128 of the recesses 126 to prevent further movement of the pins 120 with the housing 17. Instead, the sides of the recesses 62 cam the pins 120 out of the recesses 62 and into the recesses 126. That condition of the pins 50, 120 coincides with the condition shown in FIG. 2. The male and female parts 12, 14 can now be fully separated and positioned as shown in FIGS. 1 and 5 wherein the passages 36 of the housing are closed by the gate 40 and seals 41, and the passages 96 of the conduit body are closed by the closure slide 110 and seals 118.

Figure 10:
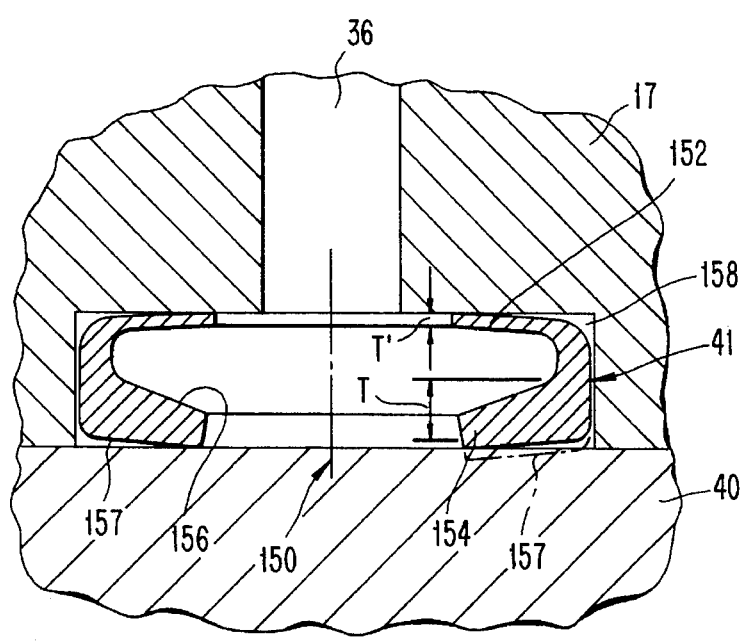
FIG. 10 is a axial sectional view taken through the sealing member of FIG. 9, with the sealing member mounted in a fluid coupling.

The metal seal member 41 is depicted in enlarged view in FIGS. 10 and 11. That seal member, preferably formed of stainless steel, is of annular configuration, having a center hole 148 which defines a center axis 150. The seal member 41 comprises a pair of annular lips 152, 154 spaced apart along the axis 150 by a groove 156. The seal member is arranged within a recess 158 formed in the housing 17, such that the thin lip 152 sealingly contacts the housing, whereas the thick lip sealingly contacts the gate 40. That is, the thick lip engages a surface which is movable relative to the seal in a direction perpendicular to the axis 150.

Each of the lips 152, 154 includes an anchored end and a free end. The anchored end of the thick lip 154 is thicker than that of the thin lip 152. For example, the thickness T of the thick lip at its anchored end is at least two times the thickness T' of the anchored end of the thin lip, and more preferably four to five times that thickness.

Due to the difference in thickness between those anchored ends, the thin lip 152 is flexible, whereas the thick lip 154 is rigid. That is, any flexing of the seal member will occur is the thin lip, which flexes about its anchored end. When flexed out of its released state, the thin lip preloads the seal to initiate a sealing action at the face of the thick (shear seal) lip. Thus, the seal member could be described as a combined lip/shear seal. Also, the thin lip can flex during operation to permit the seal member to take up float between the housing 17 and the gate 40 (or between the housing 17 and the conduit body 90) in a direction parallel to the axis 150. The thick lip 154 is rigid to minimize the occurrence of wear resulting from frictional contact with the gate 40 (or conduit body 90) during movement of the gate (or conduit body) relative to the seal in a direction perpendicular to the axis 150 (i.e., in a direction parallel to the axis 30). Hence, the seal member is able to flex to take up the lateral floating motion between the parts 17, 40 and yet is rigid at its interface with a relatively movable part to perform the necessary sealing functions without being worn at a high rate by the resulting frictional rubbing action. Such behavior of the seal is not possible with conventional metal seals of C-shaped cross-section wherein the lips have anchored ends of identical thickness.

The thick lip 154 includes an outer surface 151 which extends toward a free end 153 of the thick lip in a direction away from the thin lip 152. As a result, sealing contact between the thick lip 154 and the conduit body 90 occurs in a relatively narrow region adjacent the free end 153, so that the elastic force of the seal is concentrated at that region. This produces a highly effective sealing force.

Furthermore, when the conduit body 90 approaches the seal member 41 during a coupling operation, the inclined surface 157 of the seal member, shown in phantom lines in FIG. 10 faces the oncoming conduit body and enables the conduit body to more easily compress the seal member along the axis 150. That is, the surface 157 acts in the manner of a cam follower surface to facilitate an axial compression of the seal member by the conduit body.

The seal member 41 is arranged such that the recess 156 opens toward the axis 150. The seal member 118 is of identical construction as the seal member 41, except that the recess 156 opens away from the axis 150, as is evident from FIGS. 5 and 6. As a result, it is possible for pressure occurring in the passages 96 to force open the seal member 118 by flexing the thin lip in a direction toward the conduit body 90. This enables the seal member 118 to relieve pressure in their respective passages 96. Such pressure relief can occur, for example, following an uncoupling of the male and female members, to enable some or all of the well-head devices that had been actuated by the hydraulic pressure to return to a closed or neutral state.

It will be appreciated that the present invention provides a male/female coupling 12, 14 which enables a plurality of hydraulic passages, i.e., four, to be simultaneously interconnected. This significantly reduces the overall size of the multi-coupler structure of which each male/female coupling 12, 14 constitutes only one of many such couplings 12, 14. A multi-coupler structure of smaller size is thus able to interconnect the various subsea devices being controlled.

Furthermore, the use of pins 50, 120 for shifting the gate 40 and closure slide 110 eliminates the need for heavier and space-consuming springs to perform that function.

The ability of the male part 12 to be self-aligning (due to the looseness of the mounting part 91' within the hole 93) facilitates the axial mating of the male and female parts and eliminates the need to provide precise alignment of those parts.

The metal seal members 41, 118 are axially compressible and yet highly rugged to be resistant to frictional wear.

Although the present invention has been described in connection with preferred embodiments thereof, it will be appreciated by those skilled in the art that additions, modifications, substitutions and deletions not specifically described may be made without departing from the spirit and scope of the invention as defined by the appended claims. As pointed out earlier, the present invention can be used above or below seal level, i.e., in a liquid or gaseous atmosphere, or even in outer space.

What is claimed is:

1. A fluid coupling, comprising:

a female part including:

a housing having a longitudinal aperture formed therein defining a longitudinal axis, said aperture being of polygonal cross-section comprising at least three inwardly facing walls, a first plurality of at least three fluid-conducting passages formed in said housing and intersecting respective ones of said walls to form first lateral ports, and a gate mounted in said aperture for longitudinal sliding movement between a port-blocking position sealingly blocking said first lateral ports and a port-unblocking position unblocking said first lateral ports;

a male part including:

a conduit body defining a longitudinal axis and configured to enter said aperture, said conduit body being of polygonal cross-section corresponding to that of said aperture and comprising at least three outwardly facing walls arranged to be disposed opposite respective ones of the inwardly facing walls once the male and female parts have been joined, a second plurality of at least three fluid-conducting passages formed in said conduit body and intersecting respective ones of said outwardly facing walls to form second lateral ports, and a closure slide mounted on said conduit body for longitudinal sliding movement between a port-blocking position sealingly blocking said second lateral ports and a port-unblocking position unblocking said second lateral ports;

said conduit body being insertable axially into said aperture such that said conduit body pushes said gate to its port-unblocking position, and said housing pushes said closure slide to its port-unblocking position, and each of said first lateral ports becomes laterally aligned with one of said second lateral ports to form two pairs of aligned first and second lateral ports, and a metal seal for sealing around each said pair of aligned first and second lateral ports.

2. A fluid coupling according to claim 1, wherein said aperture comprises at least six inwardly facing walls, three of said inwardly facing walls having said first lateral ports, each of the remaining three inwardly facing walls being disposed between two of said port-containing inwardly facing walls, said conduit body comprising at least six outwardly facing walls, three of said outwardly facing walls having said second lateral ports, each of the remaining three outwardly facing walls being disposed between two of said port-containing outwardly facing walls.

3. A fluid coupling according to claim 2 further including:

at least one first connector pin for: connecting said gate to said conduit body and disconnecting said gate from said housing in response to axial insertion of said conduit body into said aperture, and for connecting said gate to said housing and disconnecting said gate from said conduit body in response to axial removal of said conduit body from said aperture, said first connector pin being engageable in a recess formed in one of said remaining inwardly facing walls;

at least one second connector pin for connecting said closure slide to said housing and disconnecting said closure slide from said conduit body in response to axial insertion of said conduit body into said aperture, and connecting said closure slide to said conduit body and disconnecting said closure slide from said housing in response to axial removal of said conduit body from said aperture, said at least one second connector pin being engageable in a recess formed in one of said remaining outwardly facing walls.

4. A fluid coupling according to claim 3, wherein there are eight said inwardly facing walls four of which contain said first lateral ports, and there are eight said outwardly facing walls four of which contain said second lateral ports.

5. A fluid coupling according to claim 1, wherein each metal seal comprises an annular metal sealing member having a center hole therethrough defining a center axis, said sealing member including first and second annular lips spaced apart along said center axis and forming a groove therebetween, each lip including an anchored end and a free end, said anchored end of said first lip being thicker than said anchored end of said second lip.

6. A fluid coupling according to claim 5, wherein said anchored end of said first lip is at least two times as thick as said anchored end of said second lip.

7. A fluid coupling according to claim 5, wherein said first lip has an outer surface extending toward said free end of said first lip in a direction away from said second lip.

8. A fluid coupling according to claim 5, wherein said metal sealing members constitute first sealing members disposed in said housing, each first sealing member having said first lip thereof engaging said gate when said gate is in its port-blocking position, there being additional metal sealing members disposed in said closure slide for sealing said first lateral ports when said closure slide is in its port-blocking position, each of said additional metal sealing members having a center hole therethrough defining a center axis, and first and second annular lips being spaced apart along said center axis to form a groove therebetween, each lip including an anchored end and a free end, said anchored end of said first lip being thicker than said anchored end of said second lip.

9. A fluid coupling according to claim 8, wherein each of said first sealing members has said groove thereof opening toward said center axis, each of said additional sealing members having said groove thereof opening away from said center axis.

10. A fluid coupling, comprising:

a female part including:
   a housing having a longitudinal aperture formed therein defining a longitudinal axis, a first fluid-conducting passage formed in said housing and intersecting said aperture to form therewith a first lateral port, and a gate mounted in said aperture for longitudinal sliding movement between a port-blocking position and a port-unblocking position;

a male part including:
   a conduit body defining a longitudinal axis and configured to enter said aperture,
   a second fluid-conducting passage formed in said conduit body and intersecting an outer periphery thereof for forming therewith a second lateral port, and
   a closure slide mounted on said conduit body for longitudinal sliding movement between a port-blocking position and a port-unblocking position;

said conduit body being insertable axially into said aperture such that said conduit body pushes said gate to its port-unblocking position, and said housing pushes said closure slide to its port-unblocking position, and said first and second ports become laterally aligned with one another;

metal seals carried by said male and female parts for creating seals around said first and second ports when said gate and said closure slide are in their port-blocking positions, and for creating seals around said first and second ports when said first and second ports are laterally aligned with one another;

at least one first connector for connecting said gate to said conduit body and disconnecting said gate from said housing in response to axial insertion of said conduit body into said aperture and for connecting said gate to said housing and disconnecting said gate from said conduit body in response to axial removal of said conduit body from said aperture; and at least one second connector for connecting said closure slide to said housing and disconnecting said closure slide from said conduit body in response to axial insertion of said conduit body into said aperture, and for connecting said closure slide to said conduit body and disconnecting said closure slide from said housing in response to axial removal of said conduit body from said aperture;

wherein said aperture is of polygonal cross sectional shape and comprises at least three walls, and said conduit body is of polygonal cross-sectional shape and comprises at least three walls, there being at least three said first fluid-conducting passages intersecting respective walls of said aperture to form three first ports, and there being at least three said second fluid-conducting passages intersecting respective walls of said conduit body to form three second ports.

11. A fluid coupling according to claim 10, wherein said at least one first connector is movably mounted on said gate, and said at least one second connector is mounted on said closure slide.

12. A fluid coupling according to claim 11, wherein said at least one first connector comprises a first pin laterally slidable in a first lateral hole formed in said gate, and said at least one second connector comprises a second pin laterally slidable in a second lateral hole formed in said closure slide.

13. A fluid coupling according to claim 12, wherein said first pin is alternately insertable into recesses carried by said housing and said conduit body, respectively, and said second pin is alternately insertable into recesses carried by said housing and said conduit body, respectively.

14. A fluid coupling according to claim 13, wherein said recesses in said housing and conduit body include cam surfaces for camming said first and second pins out of respective recesses.

15. A fluid coupling according to claim 10, wherein each metal seal comprises an annular metal seal member having a center hole therein defining a center axis, said seal member including first and second annular lips spaced apart along said center axis and forming a groove therebetween, each lip including an anchored end and a free end, said anchored end of said first lip being thicker than said anchored end of said second lip.

* * * * *